May 17, 1966 E. A. MORGAN ETAL 3,251,595
AIR CAR AND SUPPORTING APPARATUS
Filed May 11, 1962 9 Sheets-Sheet 8
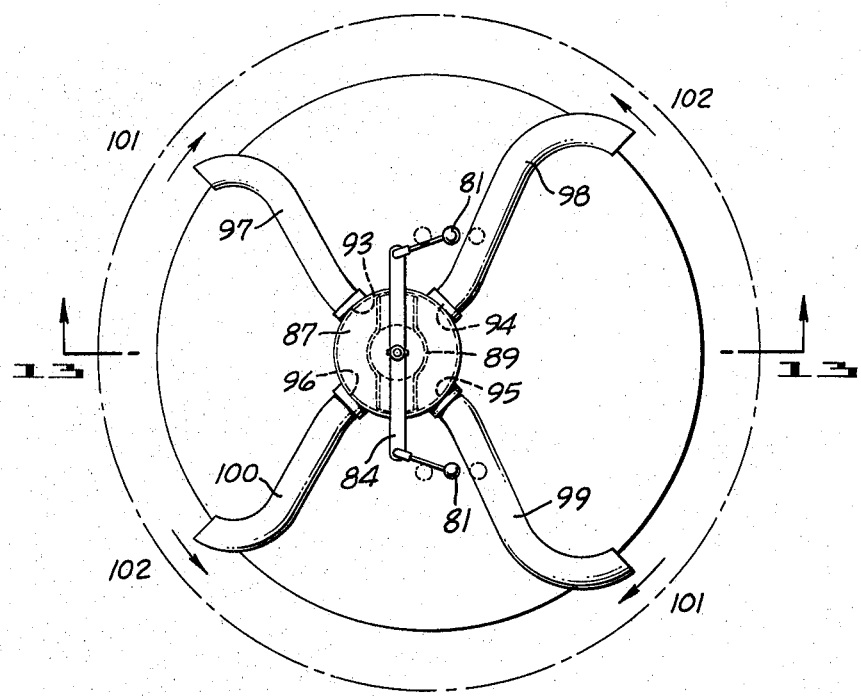
FIG_12
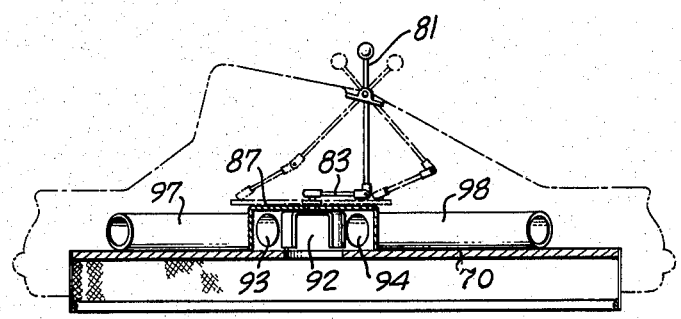
FIG_13
EDGAR ALLEN MORGAN &
KARL W. BACON
INVENTORS
BY Charles S. Evans
their ATTORNEY

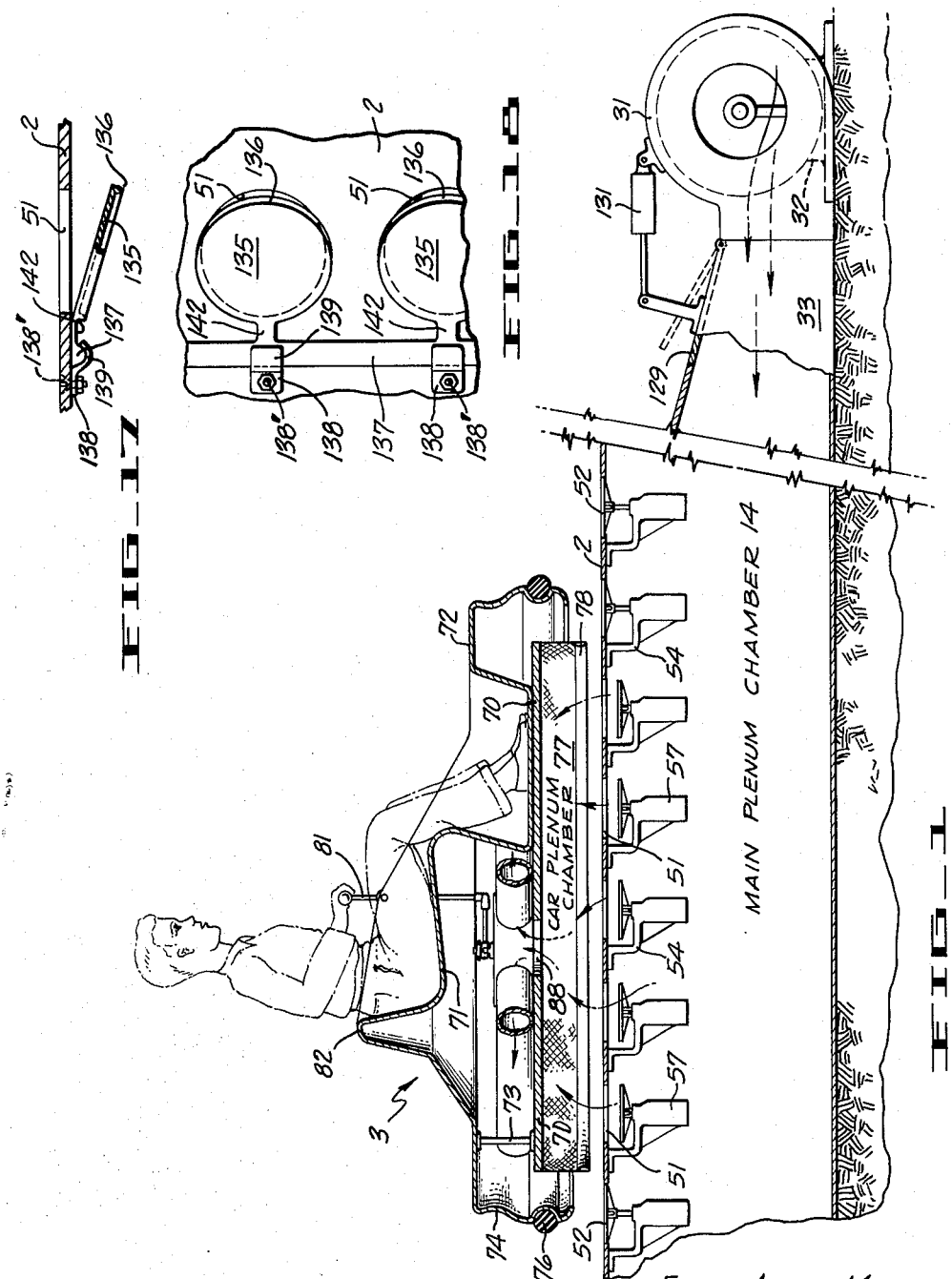

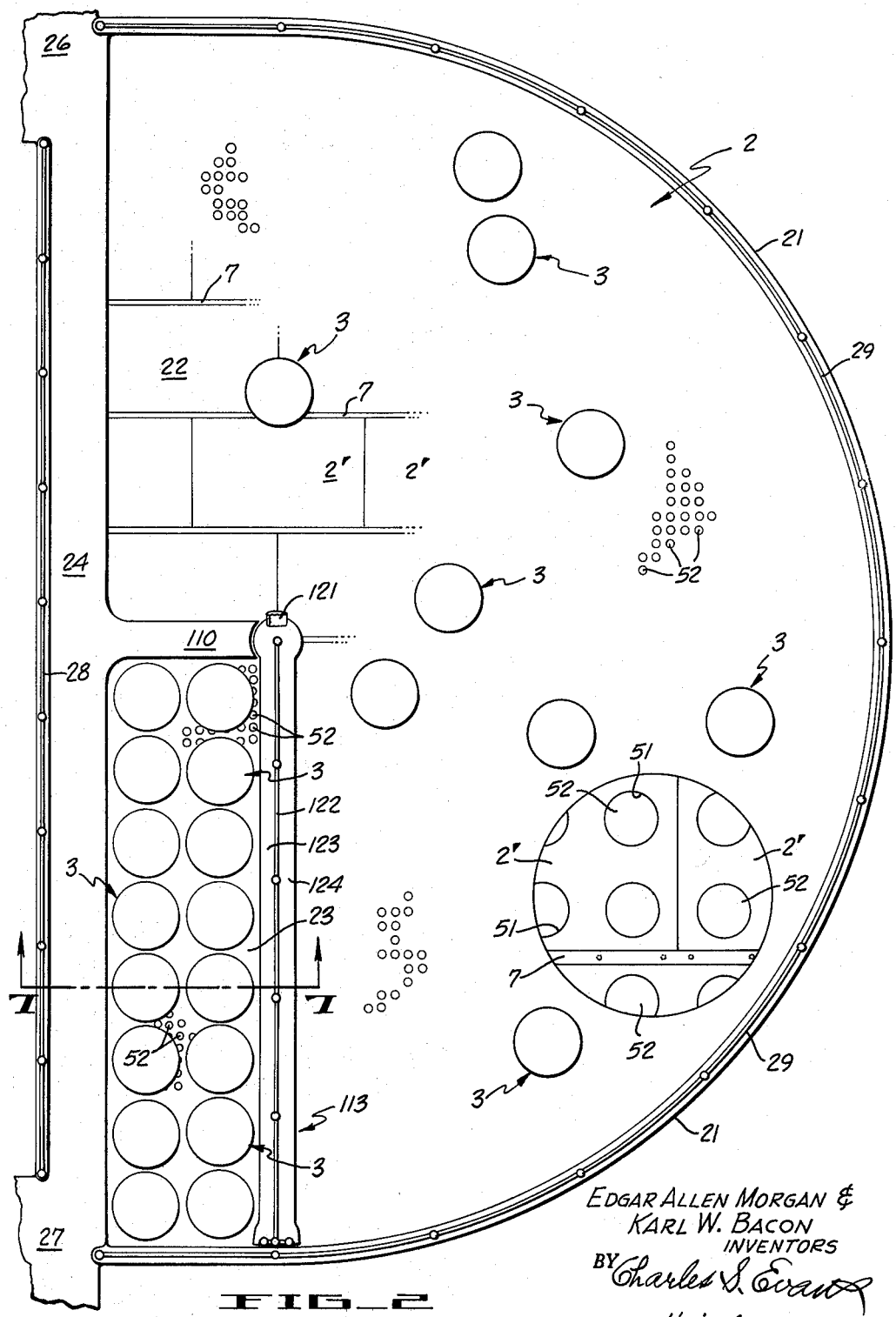

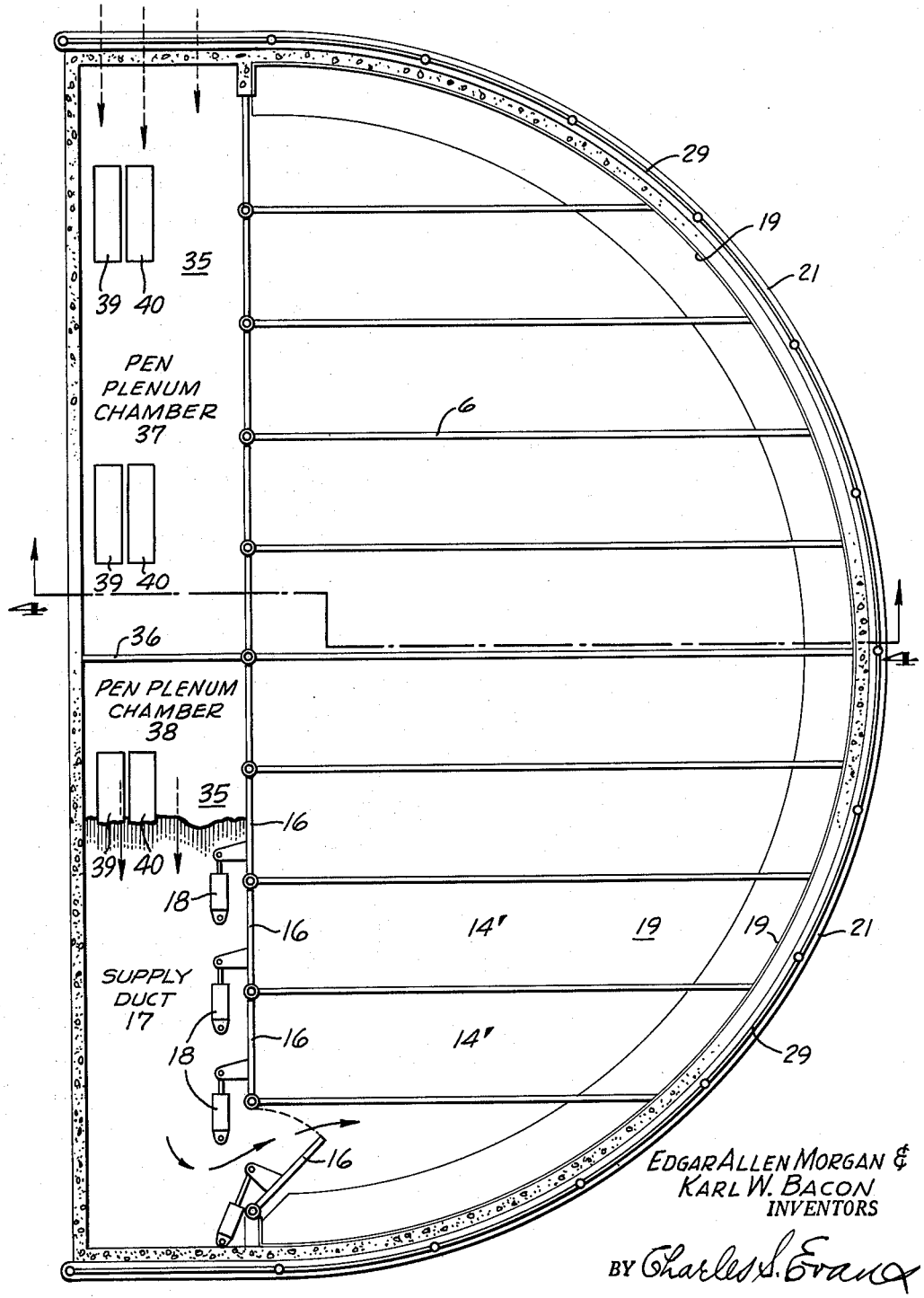

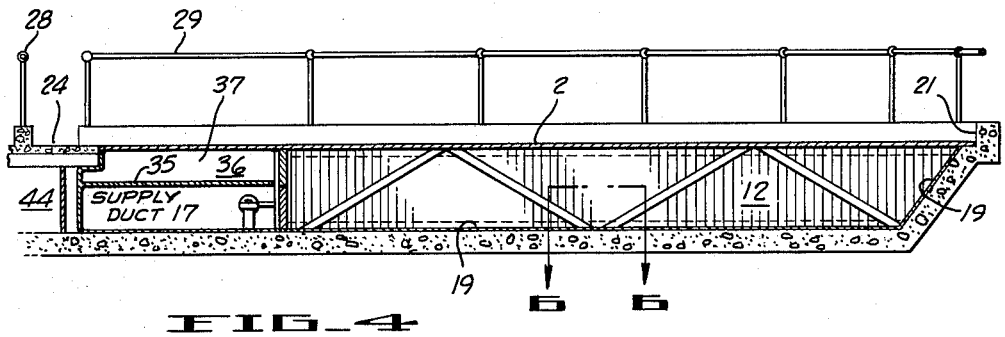
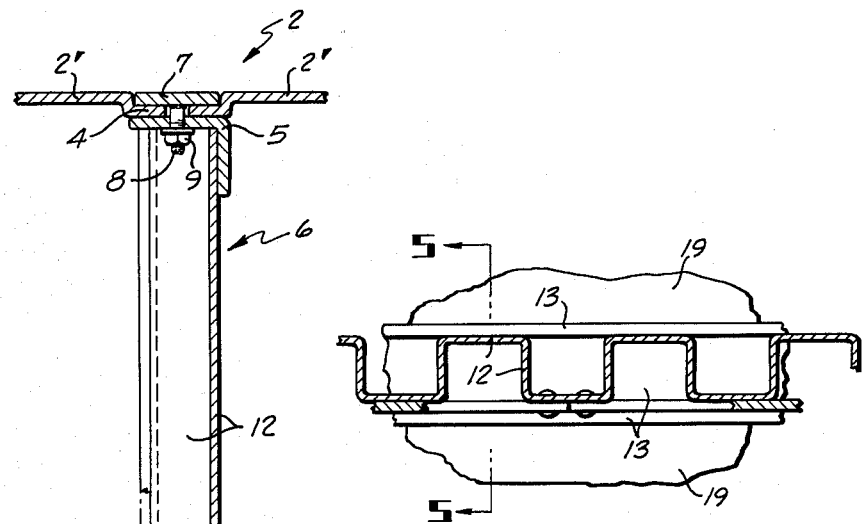
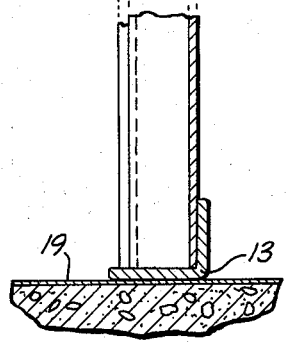

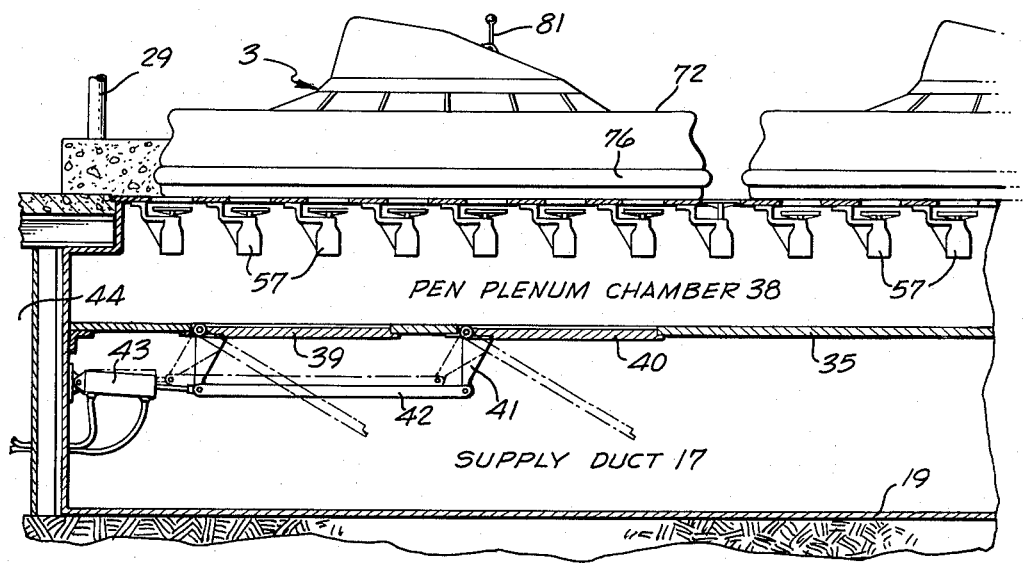
FIG_7
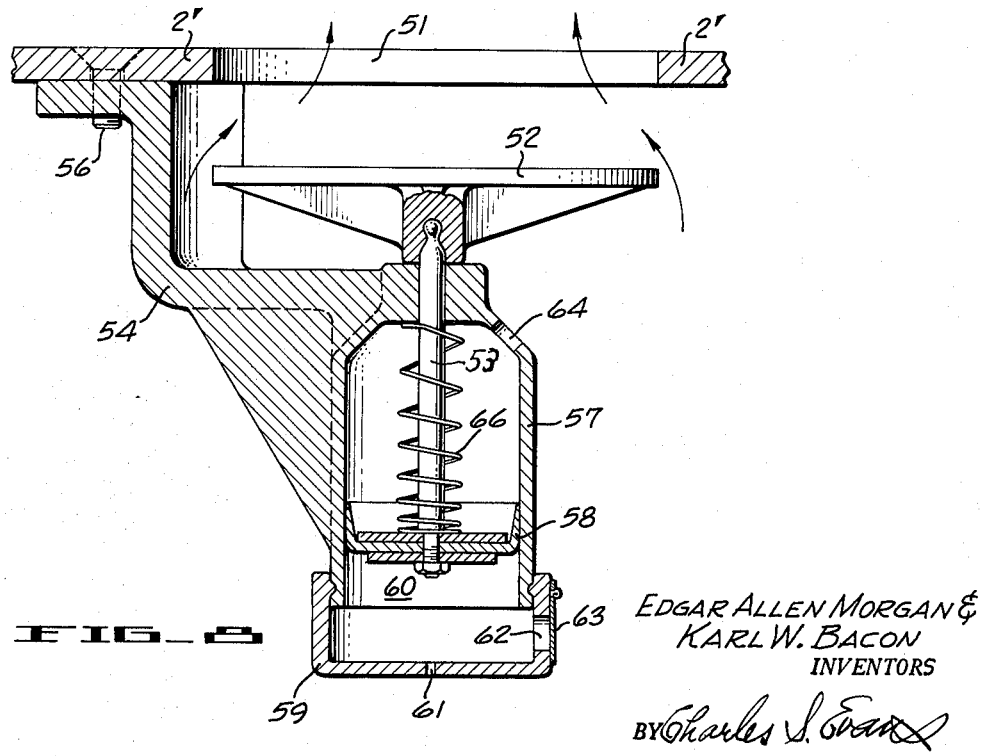
FIG_8
EDGAR ALLEN MORGAN &
KARL W. BACON
INVENTORS
BY Charles S. Evans
their ATTORNEY May 17, 1966   E. A. MORGAN ETAL   3,251,595
AIR CAR AND SUPPORTING APPARATUS
Filed May 11, 1962   9 Sheets-Sheet 6
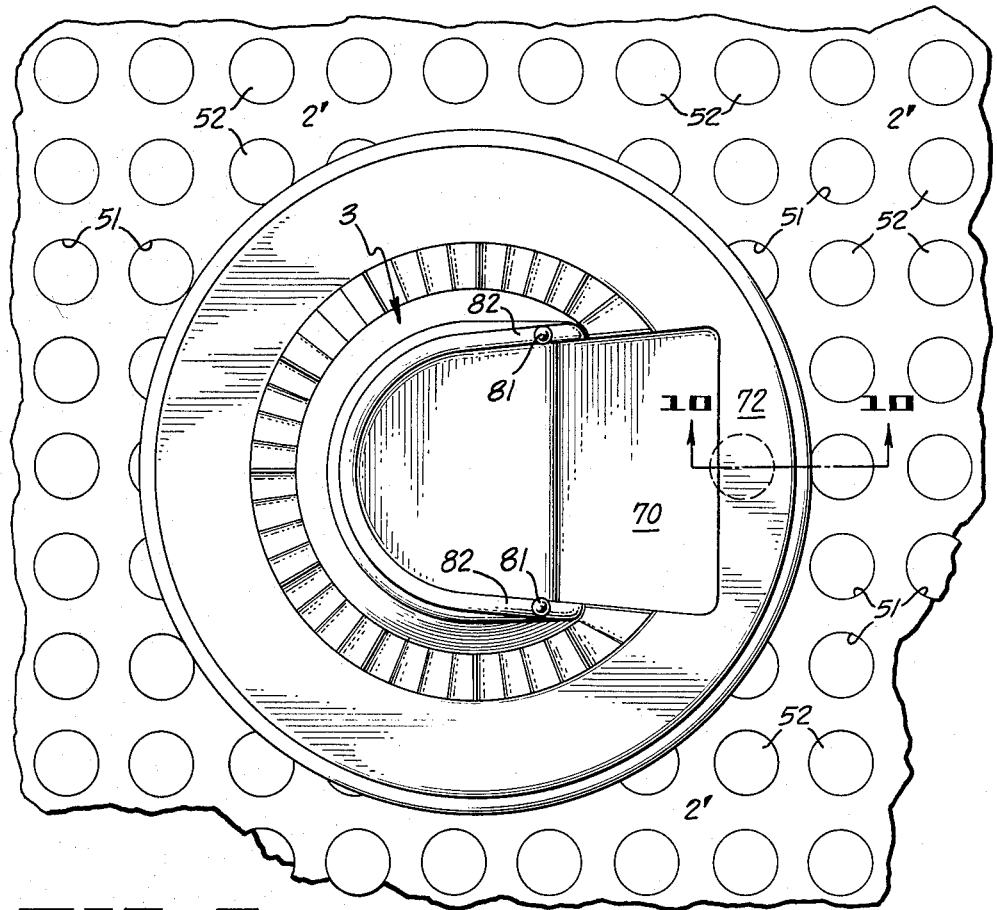
FIG_9
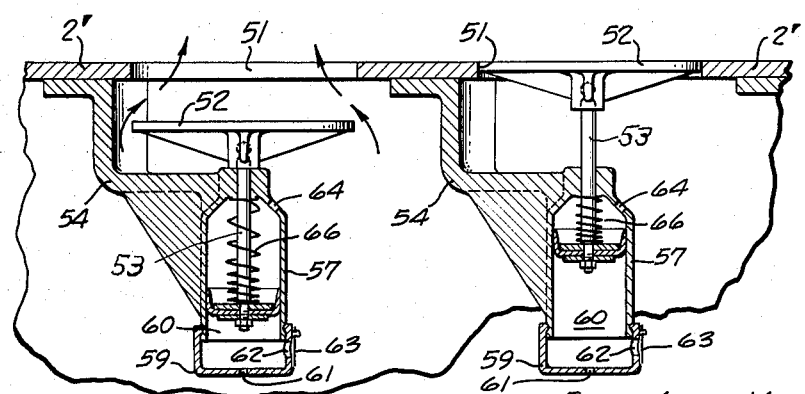
FIG_10
EDGAR ALLEN MORGAN &
KARL W. BACON
INVENTORS
BY Charles J. Evans
their ATTORNEY

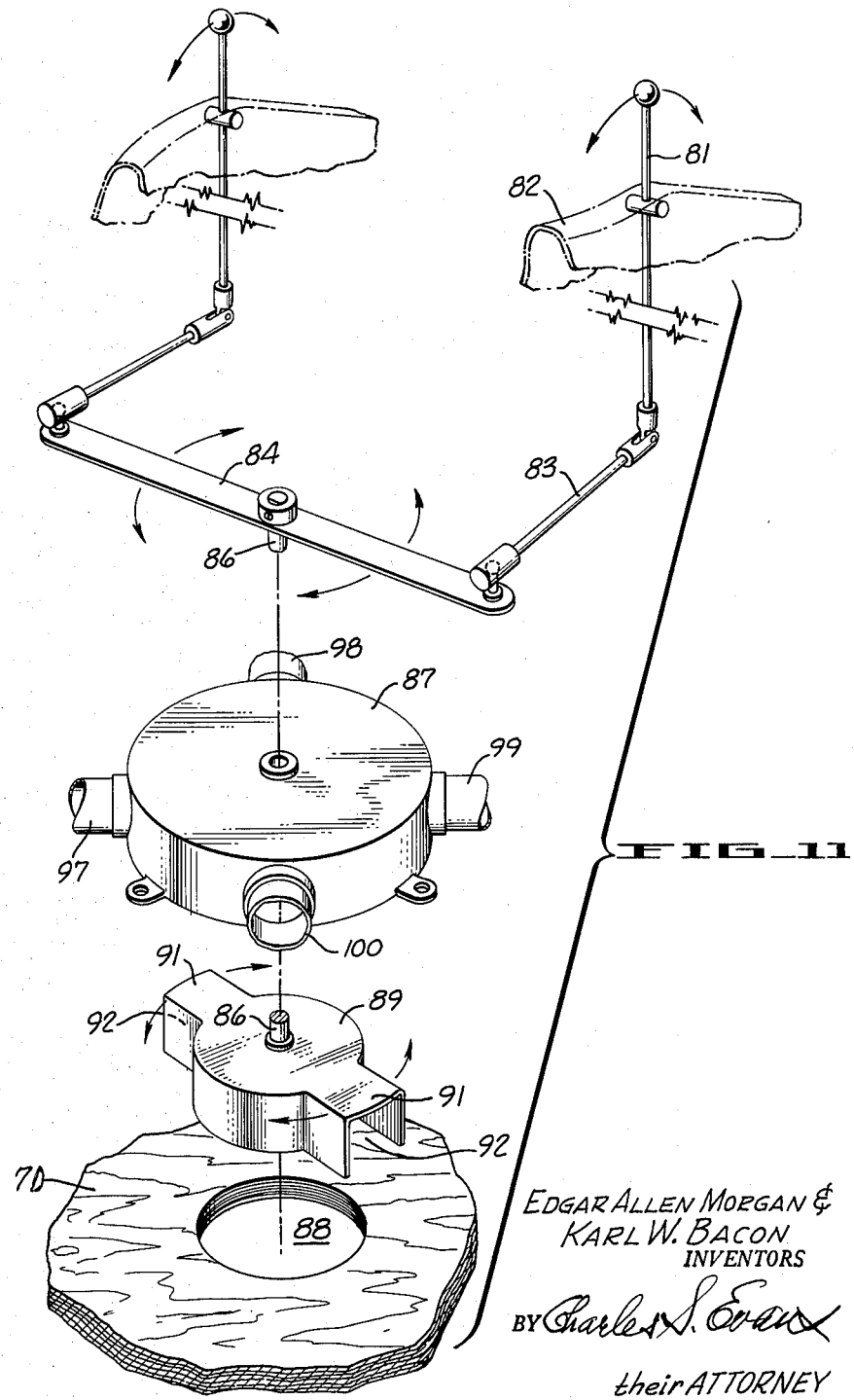

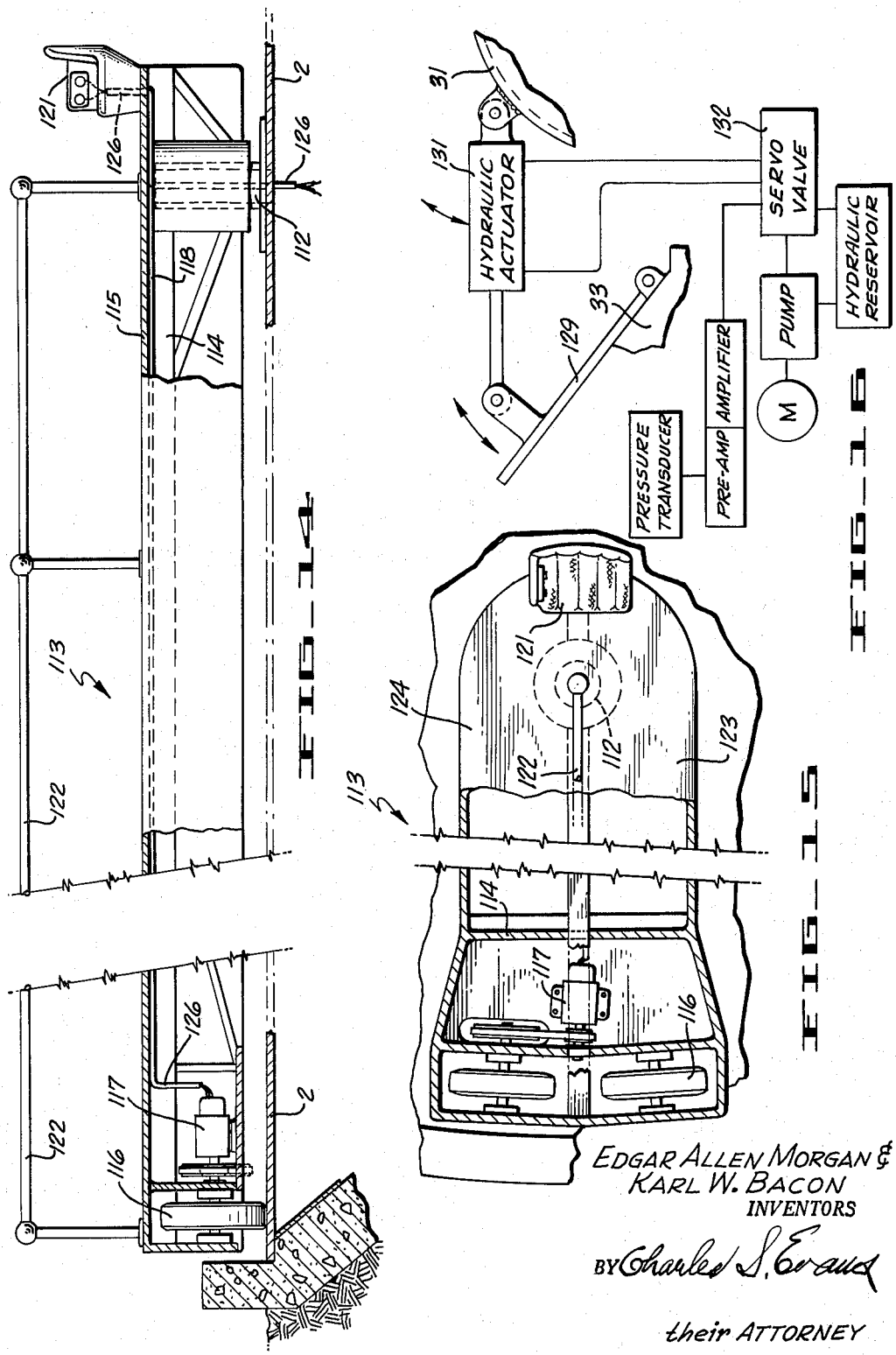

United States Patent Office 3,251,595
Patented May 17, 1966

3,251,595
AIR CAR AND SUPPORTING APPARATUS
Edgar Allen Morgan, Palo Alto, and Karl W. Bacon, Mountain View, Calif., assignors, by mesne assignments, to Walt Disney Productions, Burbank, Calif., a corporation of California
Filed May 11, 1962, Ser. No. 193,965
11 Claims. (Cl. 272—1)

Our invention relates to an air supported vehicle and means by which it is supplied with a sustaining cushion of air which is constantly replenished from a source external to the vehicle.

Another object of our invention is the provision of an air supported car or vehicle which carries no motor, propeller or fuel, and thus is free from their weight, and the considerable hazards of high speed rotating parts and fire.

Another object of our invention is to provide air pressure generating, distribution and control means by which a high volume of low pressure air can be maintained in a distribution plenum chamber below a planar deck over which our car may move, with limited areas of applied pressure directly below the car, and without material loss of air from areas not covered by our vehicles.

Another object of our invention is to provide valves in the deck above our distribution plenum chamber which automatically open when the vehicle is over them, and close when the vehicle moves to uncover them. Another object is to actuate these valves without tangible mechanical contact with the vehicle.

Other objects of this invention are to provide launching means to initiate flight of the cars as well as means to remove the sustaining air cushion, so as to drop the vehicles to the deck.

Another object is to provide a manually controlled distribution valve in each car for effecting steering of the car by means of peripheral, tangential jets derived from air under pressure in the car plenum.

Still another object is to provide a collecting or gathering boom capable of collecting cars while in flight on the flight deck, into a restricted area for loading and unloading passengers.

A further object is to provide a car of light weight construction in which the essential parts are an area to accommodate a passenger in a balancing position, and a car plenum chamber.

Our invention possesses other objects some of which with the foregoing will be brought out in the following description. We do not limit ourselves to the showing made by the description and drawings, since we may adopt variant forms of the invention within the scope of the appended claims.

Referring to the drawings:

FIG. 1 is a side elevation of the car in flight over a portion of the main distribution plenum chamber. Parts of the car and chamber structure are shown in section. Five of the supporting air flow control valves are shown in open position.

FIG. 2 is a plan view of the apparatus in which the flight deck above the plenum chamber is shown with air cars in flight. A group of cars is shown behind the collector boom in position for the loading and discharge of passengers.

FIG. 3 is a plan view of the main distribution plenum chamber with deck plates removed, and showing its divisions. A portion is broken away to show the supply duct and control gates, one of which is open.

FIG. 4 is a vertical sectional view taken in the plane indicated by the line 4—4 of FIG. 3.

FIG. 5 is a vertical sectional view on a larger scale as seen in the plane indicated by the line 5—5 of FIG. 4.

FIG. 6 is a horizontal view on a larger scale and partly in section as seen in the plane indicated by the line 6—6 in FIG. 4.

FIG. 7 is a vertical sectional view in part, taken in a plane approximately indicated by the line 7—7 in FIG. 2, through the supply duct and the overlying plenum chamber with two cars at rest in the loading station.

FIG. 8 is an elevation, largely in vertical section, of one of the automatic valves which control the flow of air from the main plenum chamber through the deck and into the car plenum chamber. The scale is approximately full size.

FIG. 9 is a plan view of our air car, and a portion of the flight deck over which it may be operated.

FIG. 10 is an elevation, mostly in vertical section, of the flight deck and two of the automatic valves. The plane of section is indicated by the line 10—10 of FIG. 9.

FIG. 11 is an exploded view in perspective of the principal parts of the car rotating mechanism.

FIG. 12 is a plan view of the rotating mechanism.

FIG. 13 is a vertical sectional view of the rotating mechanism arranged on the floor of the car. The chassis of the car assumed to be in flight is shown in broken lines, as is also the two extreme positions of the control lever and the top plane of the flight deck.

FIG. 14 is an elevation of our collector boom, partly in vertical section and with a portion removed to shorten the figure.

FIG. 15 is a plan view of the boom, partly in section and with a portion removed to shorten the figure.

FIG. 16 is a diagram of a hydraulic actuator controlled by a servo valve and related elements, by which pressure of air in the main plenum chamber is controlled.

FIG. 17 is an elevation partly in section of a modification of our valve.

FIG. 18 is a bottom view of the valve and deck shown in FIG. 17.

Our air car while sustained in operation by air pressure from below, differs radically from the conventional air cushion vehicles commonly called "ground effects machines." The latter device creates its own sustaining air cushion by prime mover means within the vehicle. Controlled steering is also operated by means, whether power or manual, carried by the machine. This of course involves motors and motor driven mechanisms, together with fuel and supplies, in addition to the vehicle proper and its passenger. Such a machine is inherently high in cost, maintenance and operation. Because it is sustained due to the reaction effect of its self-created blast of air downwardly against the earth surface below, it has a wide range of movement, restricted only by the havoc created by the blast.

Our air car is limited in its range of movement to a flight deck area, which may be as extensive as practically useful in the amusement park or other application in which it will find a principal use; or as limited as a long and narrow passage for conveyance of material or persons in an assembly plant or airport.

Installation of the equipment and the flight deck over which our car operates is moderate in cost. Maintenatnce including personnel and operation are in the low ranges.

Flight deck and ground structure

The flight deck 2 over which our air cars 3 may range is shown in FIGS. 1 and 2. The deck 2 comprises a plurality of long rectangular plates 2' having offset edges 4, FIG. 5, along their long sides. Adjacent plates are held on a horizontal angle bar 5, forming the top member of the vertical wall 6 which underlies and supports the deck. The plates 2' are clamped in place by a strip 7, having threaded studs 8 extending downwardly through the horizontal flange of the angle bar and fixed in place by a nut 9.

The wall is of conventional construction, except that on one side of the structural members, a continuous sheet 12 is fixed to the vertical flanges of the upper and lower angle bars 5 and 13. This is done to divide the plenum chamber below the deck into a plurality of separate long divisions 14′ FIG. 3, each with a control gate 16, separating it from the supply duct 17. Each gate is operated by an hydraulic cylinder 18, suitably connected into a conventional gang or individual control system arranged in any convenient location.

The plenum chamber 14 preferably below ground level, is conveniently floored and walled with concrete, and lined with metal sheets 19 as shown in FIG. 4. A low curb or extension 21 of the side walls prevents accidental escape of the cars from the flight deck; and as best shown in FIG. 3, extends all around the flight deck, including the pen areas 22 and 23, also used for passenger loading and discharge, and the walkway 24, with entry and exit openings 26 and 27 at its ends.

It is obvious from FIG. 2, that two installations of our apparatus may be disposed back to back with a diametral curb common to both. Fences 28 and 29 surmount the curbs.

Means are provided for supplying air under pressure to the main plenum chamber. A blower 31, FIG. 1, driven by a directly connected motor 32 delivers air through suitable pipes 33 into one end (upper part of FIG. 3) of the supply duct 17, from which it flows into the long plenum chamber divisions 14′, as the gates 16 are opened by the hydraulic cylinders 18.

Above the supply duct 17 as best shown in FIG. 4, and below the flight deck plates, is an extension of the main plenum chamber, separated from the supply duct below, by the horizontal wall 35. This underlies the passenger loading and discharge stations or pens 22 and 23, FIG. 2, and is divided midway of its length with the tight partition or wall 36, to form two chambers 37 and 38, comprising pen plenum chambers.

Air from the supply duct 17 is admitted as desired into each of these chambers through gates 39 and 40, a plurality of pairs of which, are arranged in the wall 35. Each pair of gates is connected by lever arms 41 and links 42 to an hydraulic cylinder 43, conventionally connected to a source of liquid under pressure, disposed in the chamber 44 underlying the walkway.

Automatic valves

An important element of our invention lies in the structure and mode of automatic operation of the valves which are closely spaced in each unit 2′ of the flight deck 2. The valves are so spaced in each unit that the same spacing is maintained with respect to all adjacent units, so that there is substantially even spacing between the valves along lines parallel to sides and ends of the deck units over the entire flight deck including both pens.

The valves are automatic in operation in that each is responsive to the presence of an air car above it, opening as the car covers it and closing behind the car as it passes.

FIG. 8 is a detail of the valve mechanism showing the opening 51 which essentially constitutes a valve seat, closed when the valve 52 enters the opening, and open when the valve sinks below the opening. Each valve 52 is carried on a stem 53, slidably arranged in a bracket 54 secured to the deck plate above it by a pair of screws 56, flush with the surface of the deck. The lower portion of the bracket is formed as a hollow cylinder 57 in which a piston 58, fixed on the lower end of the stem, reciprocates.

A plastic cup 59 releasably interlocked on the lower end of the cylinder provides a suction chamber 60 which is slowly relieved on the upward stroke of the piston through the vent 61. A fast down stroke is insured by escape of air through the port 62 normally closed by the flap valve 63. The upper end of the cylinder is open at all times to the atmosphere through the port 64.

Normally, with no air pressure in the plenum chamber, the valve is open as shown in FIG. 8 because of its weight, to which is added the expansion force of the spring 66, interposed between the piston and the top of the cylinder. With an increase in air pressure to a predetermined amount in the plenum chamber, the rush of escaping air past the valve tends to close it, and does so unless it is covered by a car. The upward movement of the piston 58 is slowed down by the resistance of the vented suction chamber so that the valve closes quietly. The opening of the valve is also quiet on account of the limitation on the escape of air through the flap valve. The valve 52 is preferably of plastic and its impact on the top of the metal cylinder 57 is substantially without noise.

The air car

The air car with a passenger in control is shown in flight, above the deck in FIG. 1. The car and underlying flight deck and plenum are partly in vertical section. In FIG. 9 the car and flight deck appear in plan.

The main element of the car is a circular flat floor plate 70, on which a seat 71 and chassis 72 are arranged so that the center of gravity of car with a passenger in the seat lies approximately in a line perpendicular to the floor plate when the floor plate is parallel to the deck. The chassis is supported on the plate as shown, by elements of the chassis and the cross beam 73. The chassis which is generally circular in shape is grooved around its side 74 to carry a heavy rubber bumper 76.

Extending entirely around the plate 70 in an air tight connection and depending therefrom is a flexible skirt 77 of rubber or heavy fabric preferably sealed or faced on one side with a suitable plastic so as to prevent the passage of air therethrough. The lower edge of the skirt is reenforced with a wear-resistant nylon edging bead 78 to withstand the abrasive effect of contact with the deck.

The floor plate and dependent skirt therefore constitute a car plenum chamber which fills with air from the open valves under the car. This lifts the car free of the deck, and although the air spills out under the lower edge of the skirt, the upward pressure of air flowing from the open valves is enough to sustain the car; and the back or reaction pressure against the valves holds them open so long as the car is above the valves. It follows of course that as the car travels forward the back pressure effect travels with the car plenum chamber and is removed from each valve 52 as it is uncovered by the car plenum chamber whereupon the pressure of air flowing past the valve, immediately closes it. At the same time, the valves covered by the advancing car plenum chamber are subjected to the back pressure of the plenum chamber, and in response thereto open to permit the flow of air therepast and into the car plenum chamber.

With the seat 71 and the passenger directly above the center of gravity of the car, a small change of position of the passenger, such as leaning forward, or to one side changes the center of gravity and causes the car to tip in that direction, placing the floor plate 70 at a small angle to the deck. It is literally true that the car then starts "sliding down hill"—a hill of air constantly renewed as closed valves open when covered by the advancing car plenum chamber, and open valves close when they are passed by the car plenum chamber.

Direction control

While the air car can be moved in any direction and at chosen speed by mere shifting of the passenger's body, means are also provided for turning the car on its own axis, so that the passenger may if he so desires, face in the direction in which he is moving.

As shown in FIGS. 1 and 11, a control lever 81 is pivoted in each side 82 of the chassis; and a link 83 connects the lower end of each lever with an end of the bar 84, which is rigidly fixed to the upper end of a shaft 86, journaled in the center of the cup-shaped valve housing 87, secured open face down on the floor plate 70, and over the aperture 88 therein. Inside the housing is a diversion valve 89, fixed on the lower end of the shaft 86, so that it has rotary motion within the housing 87 corresponding to the angular displacement of the bar 84, effected in turn by the control levers 81.

The diversion valve in its main body is also cup shaped and arranged within the housing, open face down and close fitting over the aperture 88. On opposite sides, the top and side walls of the valve are extended as shown in the lower portion of FIG. 11 to provide oppositely positioned extensions 91, each enclosing a passage 92 from the interior of the valve to either of two openings 93 or 94 on one side of the valve housing, as determined by movement of the control levers 81, and simultaneously blocking off openings 95 and 96 respectively on the opposite side of the valve housing.

Extending from the valve housing openings 93, 94, 95 and 96 are jet pipes 97, 98, 99 and 100 respectively. The pairs 97 and 99 are curved as shown to turn the air car clockwise as indicated by the arrows 101; and the pairs 98 and 100 curved to turn the car counterclockwise as indicated by the arrows 102. Thus by a combination of leaning forward to initiate and continue movement, plus a small angular change in the valve 89, effected by control levers 81, the passenger can travel forwardly about the flight deck, turning and stopping as he desires.

Loading and unloading

It will be clear from the above that a considerable number of our air cars after free flight over the deck, might voluntarily assemble in a predetermined area, but experience with people in public gatherings suggests that some degree of compulsion is necessary for orderly handling of any facility intended for public use, whether free or paid.

It is therefore desirable to provide assembly areas or pens 22 and 23 on our flight deck within which a plurality of cars may be closely positioned for the loading and unloading of passengers. It is also desirable to provide just enough cars to fill each of the pens, so that cars from one pen may be out on the flight deck, while cars in the other pen are first being emptied of passengers and then loaded with others.

Pivotally mounted on the end of the pier 110 FIG. 2 and about the hollow post 112 FIG. 14 fixed thereon is a collector boom 113 comprising frame 114 and floor 115, and extending across the front of the pen, and supported at the free end on a pair of wheels 116, bearing on the extreme edge of the flight deck or adjoining concrete curb. One of the wheels is connected by chain to the motor 117 electrically connected to the control panel and operator's station 121, arranged over the pivoted end of the boom. A railing 122 divides the boom lengthwise into two walkways 123 and 124, the one inside in either position of the boom giving easy access to the outer row of cars collected in the pen.

A conduit 126 on the underside of the flooring 115 of the collector boom, and extending from the motor 117 to the control station 121, and then down through the hollow post 112 to the main control chamber 44 contains the electric wiring for supplying the motor.

Plenum chamber pressure

Although the valves, FIG. 10 are quite simple, it is desirable to have the minimum number needed for satisfactory results. To a certain point, car responsiveness and maneuverability increase as the size of the valve decreases, and the density or percentage of openness in the deck goes up. Although good results can be had with a wide range of valve sizes and densities it is found that a density of openness in the flight deck of around 35% with a valve diameter of 6" to 7" gives excellent results.

Responsiveness improves with increased blower pressure, but for our purposes, high volume, low pressure blowers operating at about 5" water pressure seem most efficient and satisfactory.

If a system is designed for a given pressure, it will perform much more smoothly if pressure variation is kept within plus or minus 5%. The pressure can be regulated by inlet controls on the blower, but a discharge control on the blower outlet, as by a gate 129, FIG. 1 gives the most positive and even regulation. It can be accomplished by conventional means, such as an hydraulic actuator 131 controlled by a servo valve 132 which is actuated electronically through a pressure sensing device. A pressure transducer is used to sense very small pressure changes with minimum lag. Its output signal is amplified by a conventional pre-amp and amplifier circuit. The output of this circuit is used to control an hydraulic servo valve which in turn proportions hydraulic oil to the side of the hydraulic actuator requiring pressure at that moment.

Each pen or loading station 22, 23 as shown in FIG. 2, has a capacity of sixteen cars. These cars are shown at rest on an area of deck immediately above the separate plenum chamber 38 (FIGS. 2 and 3) into which air may be admitted through gates 39 and 40. The two station or pen areas are of such area that the blower 31 can supply enough air to close all the valves in both areas not covered by cars when all the gates 39 and 40 are open. At that time air is flowing from the supply duct 17 into the station plenum chambers, and through the valves 52 covered by cars to pressurize each car plenum chamber 69. As soon as the pressure reaches a certain point, depending on the load, each car will rise from the deck.

In the interval during which the pen plenum chambers are being pressurized, the gates 16 are being opened in rapid succession to pressurize the long plenum chambers 14′, FIG. 3. The small units handled in succession require less blower capacity than would be required by the entire main plenum chamber at one time.

The closing of the valves 52 over the entire flight deck follows quickly; and the collector boom may then be swung through 180° to close the pen area 22, forcing any laggard cars back into the area. The circular shape materially aids an orderly formation. This movement of the boom from station 23 to station 22 of course releases the cars from station 23; and these are now ready to take off and roam around the flight deck at will until a bell or other signal indicates the end of the flight and the starting of the sweeping movement of the boom. Usually the bell starts a voluntary movement toward the empty pen or station, but the inexorable sweep of the boom always supplies additional incentive to keep ahead of it, or a willingness to be swept along by it into the orderly assembly of the pen.

Thus the swinging of the boom to open one pen of loaded cars and collect in the other pen the loaded cars from the flight deck, continues at the end of each flight period. When operations are to be closed down, the cars are all assembled in the pens, and the control gates 39, 40 are closed cutting off the air supply to the assembled cars, which then settle to the deck.

There is another method of getting a car airborne. An air cushion can be established in a car plenum chamber by simply lifting one side of the car and dropping it quickly over an area in which the valves are closed. This creates a momentary pressure rise under the car which opens valves enough to pass some air into the car plenum chamber. This triggers the opening of other valves under the car plenum chamber, and the car is immediately fully supported by air flowing from the open valves. The air cushion can be removed by lifting one edge of the car, until pressure is lost and the valves under the car close. The car can then be lowered gently to the deck.

Relatively small quantities of air are required to support a vehicle on a thin film of air no more than a fraction of an inch clearance above the deck. Under these conditions it has been found that a gliding flight can be achieved using the same principles of valve actuation, but using a valve of simpler design.

Since the air cushion under a car supported close to the deck is relatively thin and non-resilient, there is little tendency for the car to bounce, and little need for dash pots on valves. The valve 135, FIGS. 17 and 18, is preferably molded of synthetic rubber, because of weather resistance and natural damping combined with resiliency. The valves can be molded singly or in multiples, with a configuration that tends to bias them in an open position as shown in FIG. 17. The configuration can be designed to give any spring rate desired. To modify weight and provide the desired degree of stiffness, the valve periphery is as shown in FIG. 17, with a short flange 136 extending downwardly from the periphery, leaving the center relatively thin. The valves may be molded singly or in multiples of four or six connected by the strip 137; and are flat on the upper side so that each valve when closed lies close to the under side of the deck, lapping the valve opening by a fraction of an inch. The configuration is such as to bias each valve in an open position and can readily be designed to give almost any spring rate desired.

Whether molded singly or in multiple the valves are mounted on the under side of the deck by a metal clamp 138, held by screw 138' to the deck 2, and with the short curved arm 139 engaged around the beaded strip 137 to which the valve 135 and its hinged tab 142 are integrally attached. The spring rate designed into the resilient tab provides the force which teamed with the pressure under the car overcomes the pressure of the main plenum chamber and opens the valves as the car covers them.

We claim:
1. A support structure for use with an air borne vehicle comprising:
  (I) an enclosure hermetically secure at its bottom and sides,
  (II) a flight deck covering the enclosure to form therewith a plenum chamber and having a plurality of valve openings therein,
  (III) means for introducing air into said plenum chamber and maintaining the same under substantially constant super atmospheric pressure, and
  (IV) a valve arranged below each valve opening in the deck to close or open automatically in response to variations in air pressure acting thereon when the vehicle moves from a position over one valve to a position above another valve.

2. A support structure in accordance with claim 1 in which the following element is included in the combination:
  (V) a spring arranged to resist closing of each valve.

3. An amusement ride comprising:
  a plurality of passenger-carrying air borne vehicles;
  a horizontal flight deck over which said vehicles are air borne, said flight deck including a loading-unloading area wherein said vehicles are positioned to receive and discharge passengers, the remainder of the area of said flight deck being utilized for free flight of said vehicles;
  vertical curb means defining the periphery of said flight deck so as to restrain said vehicles from leaving said flight deck;
  a collector boom which overlies said flight deck; and means for swinging said boom over said flight deck so as to contact said air borne vehicles while they are air borne and urge them into said loading area.

4. An amusement ride comprising:
  a plurality of passenger-carrying air borne vehicles;
  a horizontal flight deck of annular configuration over which said vehicles are air borne;
  vertical curb means defining the periphery of said flight deck so as to restrain said vehicles from leaving said flight deck, said periphery defining a portion of a circle;
  a collector boom which overlies said flight deck, said boom having a length approximating the radius of said circle, with one end of said boom being pivotally mounted at the center of said circle;
  and power means for swinging said boom over said flight deck so as to contact said air borne vehicles while they are air borne and urge them into said loading area.

5. A support sturcture for use with a plurality of air borne vehicles, comprising:
  an enclosure hermetically secure at its bottom and sides;
  a horizontal flight deck covering said enclosure to define a plenum chamber and over which said vehicles are air borne, said flight deck including a loading-unloading area wherein said vehicles are positioned to receive and discharge passengers, the remainder of the area of said flight deck being utilized for free flight of said vehicles, said flight deck being formed with a plurality of valve openings;
  vertical curb means defining the periphery of said flight deck so as to restrain said vehicles from leaving said flight deck;
  means for introducing air into said plenum chamber and maintaining the same under substantially constant super atmospheric pressure;
  a valve arranged below each valve opening in the deck to close or open automatically in response to variations in air pressure acting thereon when the vehicles move from a position over one valve to a position above another valve;
  a collector boom which overlies said flight deck;
  and means for swinging said boom over said flight deck so as to contact said air borne vehicles while they are air borne and urge them into said loading area.

6. A support structure as set forth in claim 5 wherein the space in said enclosure below said loading-unloading area is divided from the remainder of the space below said flight deck whereby the latter space may be provided with air at super atmospheric pressure without pressurizing the air below the loading-unloading area.

7. A support structure for use with a plurality of air borne vehicles, comprising:
  an enclosure hermetically secure at its bottom and sides;
  a horizontal flight deck covering said enclosure to define a plenum chamber and over which said vehicles are air borne, said flight deck being formed with a plurality of valve openings;
  vertical curb means defining the periphery of said flight deck so as to restrain said vehicles from leaving said flight deck, said periphery defining a portion of a circle;
  means for introducing air into said plenum chamber and maintaining the same under substantially constant super atmospheric pressure;
  a valve arranged below each valve opening in the deck to close or open automatically in response to variations in air pressure acting thereon when the vehicle moves from a position over one valve to a position above another valve;
  a collector boom which overlies said flight deck, said boom having a length approximating the radius of said flight deck, with one end of said boom being pivotally mounted on the center-line of said flight deck;
  and power means for swinging said boom over said flight deck so as to contact said air borne vehicles while they are air borne and urge them into said loading area.

8. An air borne vehicle for use with a flight deck formed with openings through which pressurized air is directed upwardly, comprising:
  a base plate;
  a pendant skirt depending from said base plate to form a plenum chamber having its open side facing downwardly;
a passage extending vertically through said base plate;
a plurality of horizontally directed nozzle means supported by said base plate above said passage;
and control means operatively interposed between said nozzle means and said passage to selectively direct pressurized air to a desired portion of said nozzle means.

9. An air borne vehicle for use with a flight deck formed with openings through which pressurized air is directed upwardly, comprising:
a base plate;
a passage extending vertically through said base plate;
a pendant skirt depending from said base plate to form a plenum chamber having its open side facing downwardly;
first and second tangentially directed nozzle means on said base plate above said passage;
and control means operatively interposed between said passage and said first and second nozzle means to selectively direct pressurized air into either said first or into said second nozzle means.

10. An air borne vehicle for use with a flight deck formed with openings through which pressurized air is directed upwardly, comprising:
a base plate;
a pendant skirt depending from said base plate to form a plenum chamber having its open side facing downwardly;
a passage extending vertically through said base plate;
a seat attached to said base plate to support a passenger at substantially the center of gravity of said vehicle;
a plurarity of horizontally directed nozzle means supported by said base plate above said passage;
and control means operatively interposed between said nozzle means and said passage to selectively direct pressurized air to a desired portion of said nozzle means.

11. An air borne vehicle for use with a flight deck formed with openings through which pressurized air is directed upwardly, comprising:
a base plate;
a pendant skirt depending from said base plate to form a plenum chamber having its open side facing downwardly;
a seat attached to said base plate to support a passenger at substantially the center of gravity of said vehicle;
a passage extending vertically through said base plate;
first and second tangentially directed nozzle means on said base plate above said passage;
and control means operatively interposed between said passage and said first and second nozzle means to selectively direct pressurized air into either said first or into said second nozzle means.

References Cited by the Examiner
UNITED STATES PATENTS

| | | | |
|---|---|---|---|
| 1,786,969 | 12/1930 | Van Der Henel | 237—50 |
| 2,083,431 | 6/1937 | Cole | 46—88 |
| 2,315,627 | 4/1943 | Lamb | 214—1 |
| 2,432,155 | 12/1947 | Herold | 124—6 |
| 3,078,940 | 2/1963 | Rolle | 180—7 |
| 3,081,886 | 3/1963 | Flexman et al. | 214—1 |
| 3,097,752 | 7/1963 | Thumin | 214—1 |

RICHARD C. PINKHAM, *Primary Examiner.*